United States Patent [19]
Bergstedt et al.

[11] Patent Number: 6,038,122
[45] Date of Patent: Mar. 14, 2000

[54] DECOUPLING CAPACITOR

[75] Inventors: Leif Bergstedt, Sjömarken; Björn Rudberg, Gothenburg, both of Sweden

[73] Assignee: Telefonaktiebolaget LM Ericsson, Stockholm, Sweden

[21] Appl. No.: 09/137,682

[22] Filed: Aug. 21, 1998

[30] Foreign Application Priority Data

Aug. 22, 1997 [SE] Sweden .................................. 9703036

[51] Int. Cl.[7] ........................................... H01G 4/35
[52] U.S. Cl. ........................ 361/306.2; 361/303; 361/311; 361/301.2
[58] Field of Search ................... 361/301.1, 303, 361/306.1, 306.3, 308.1, 309, 311, 312, 313, 321.2, 329, 330, 301.2

[56] References Cited

U.S. PATENT DOCUMENTS

| | | | |
|---|---|---|---|
| 3,999,012 | 12/1976 | Dym | 178/18 |
| 4,047,240 | 9/1977 | Insetta | 361/321 X |
| 5,027,253 | 6/1991 | Lauffer et al. | 361/321 |
| 5,075,645 | 12/1991 | Eda et al. | 333/34 |
| 5,354,716 | 10/1994 | Pors et al. | 437/52 |
| 5,615,089 | 3/1997 | Yoneda et al. | 361/764 |
| 5,764,106 | 6/1998 | Deen et al. | 330/279 |

*Primary Examiner*—Kristine Kincaid
*Assistant Examiner*—Eric Thomas
*Attorney, Agent, or Firm*—Burns, Doane, Swecker & Mathis, L.L.P.

[57] ABSTRACT

In a decoupling capacitor for decoupling radio frequency AC components of, e.g., a DC supply current to a circuit, at least one plate of the capacitor is tapered, whereby AC components of different frequencies are decoupled at different distances from the circuit.

5 Claims, 1 Drawing Sheet

DECOUPLING CAPACITOR

This application claims priority under 35 U.S.C. §§ 119 and/or 365 to Application No. 9703036-5 filed in Sweden on Aug. 22, 1997; the entire content of which is hereby incorporated by reference.

TECHNICAL FIELD

The invention relates generally to decoupling capacitors and more specifically to decoupling capacitors for radio frequency applications.

BACKGROUND OF THE INVENTION

In connection with radio frequency chips, there is a need to decouple radio frequency AC components from DC control and supply currents as close to the chip as possible.

To meet that need, a number of separate capacitors of different capacitance values are used. A small capacitor may e.g. be placed on the chip to decouple AC components of the highest frequencies, while a somewhat larger capacitor may be placed on the chip module close to the chip to decouple AC components of lower frequencies, and at least one further, larger capacitor may be placed on the circuit board close to the chip module to decouple AC components of the lowest frequencies.

To use a plurality of capacitors is quite expensive. Moreover, a decoupling capacitor on the chip itself requires a lot of space on the chip.

SUMMARY OF THE INVENTION

The object of the invention is to bring about a decoupling capacitor which enables decoupling of a wide range of radio frequency AC components.

This is attained by means of the decoupling capacitor according to the invention in that it has progressive capacitance values from one connection point to the other. Hereby, a single decoupling capacitor can be used to decouple a wide range of radio frequency AC components.

BRIEF DESCRIPTION OF THE DRAWINGS

The invention will be described more in detail below with reference to the appended drawing, in which.

DETAILED DESCRIPTION OF THE INVENTION

Figure 1:
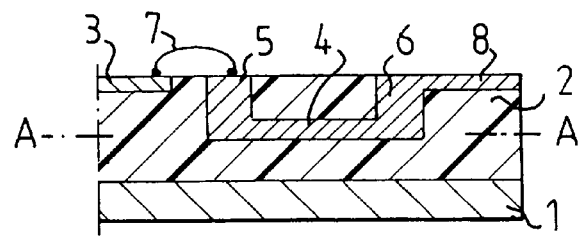
FIG. 1 is a partial cross-sectional view of a chip module comprising an embodiment of a decoupling capacitor in accordance with the invention.

FIG. 1 is a partial cross-sectional view of a chip module having a decoupling capacitor in accordance with the invention.

The chip module in FIG. 1 comprises a ground plane 1, a layer 2 of dielectric material on the ground plane 1, and a chip 3 located in a recess in the dielectric layer 2.

A capacitor plate 4 in accordance with the invention is embedded in the dielectric layer 2 at a distance from the ground plane 1, forming a decoupling capacitor with the latter.

The capacitor plate 4 in the embodiment in FIG. 1 has two connecting terminals 5 and 6 extending from the plate 4 to the top of the dielectric layer 2. The connecting terminal 5 is bonded to a terminal (not shown) on the chip 3 by means of a bonding wire 7, while the connecting terminal 6 is connected to a conductor or connecting pad 8 on the dielectric layer 2.

Figure 2A:
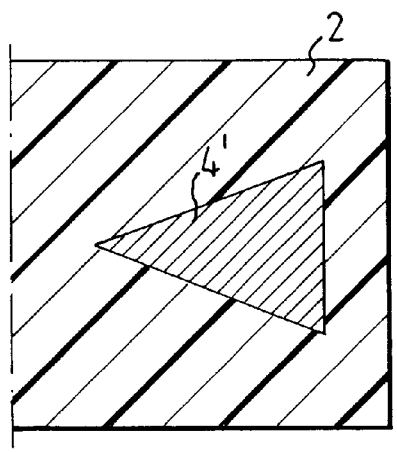
FIGS. 2a–2c are views along line A—A in FIG. 1 of different embodiments of one of the plates of the decoupling capacitor according to the invention.
Figure 2B:
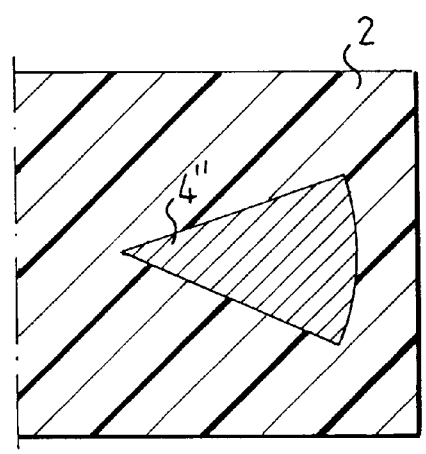
Figure 2C:
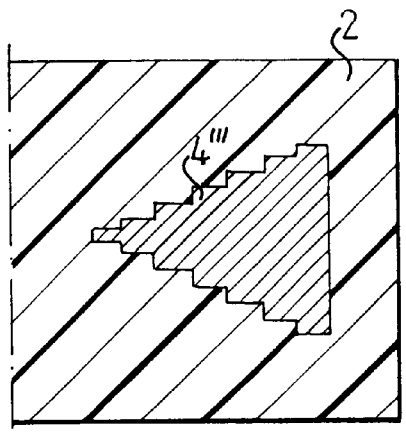

In FIGS. 2a–2c, three different embodiments of the capacitor plate embedded in the dielectric layer 2 are shown. Common to the embodiments shown in FIGS. 2a–2c is that the capacitor plates are tapered in the direction towards the connecting terminal 5 bonded to the chip 3 via the bonding wire 7.

In FIG. 2a, a capacitor plate 4' having a triangular form is shown, while FIG. 2b shows a capacitor plate 4" having a fan shape is shown, and FIG. 2c shows a capacitor plate 4''' having stepped sides.

Other shapes should be obvious to anyone skilled in the art as long as the general requirement on the capacitor plate to be tapered is fulfilled.

It is to be understood, that the other plate of the capacitor does not necessarily have to be a ground plane in a chip module, but the capacitor may be a discrete component having one or both plates tapered.

By making at least one plate of the capacitor tapered in accordance with the invention, AC components of different frequencies will be decoupled at different distances from the connecting terminal.

By locating the tapered capacitor plate 4 with its the tapered end, i.e. the connecting terminal 5, towards the chip 3 as illustrated in FIG. 1, AC components of higher frequencies will be decoupled closer to the chip 3 than AC components of lower frequencies.

It would of course be possible to turn the capacitor plate 180°, whereby AC components of lower frequencies would be decoupled closer to the chip 3 than AC components of higher frequencies.

As should be apparent from the above, a simpler solution to the problem of decoupling AC components of different radio frequencies is obtained by means of the decoupling capacitor according to the invention.

We claim:

1. A decoupling capacitor to be connected via a connecting terminal to a radio frequency chip for decoupling radio frequency AC components, comprising two plates separated by a dielectric layer, wherein the width of at least one of the plates is tapered towards the connecting terminal to decouple AC components of different frequencies along the length of the plate.

2. The decoupling capacitor of claim 1, wherein the respective tapered plate is triangular shaped.

3. The decoupling capacitor of claim 1, wherein the respective tapered plate is fan shaped.

4. The decoupling capacitor of claim 1, wherein the respective tapered plate is stepped along its sides.

5. A chip module comprising a ground plane, a dielectric layer on the ground plane, a chip located in a recess in the dielectric layer, and a capacitor plate in the dielectric layer, forming a capacitor with the ground plane, and being interconnected between a conductor on the dielectric layer and a terminal on the chip, wherein the width of the capacitor plate is tapered towards the chip.

* * * * *